United States Patent [19]

Bella

[11] Patent Number: 4,899,906

[45] Date of Patent: Feb. 13, 1990

[54] AUTOMATIC DISPENSER, PARTICULARLY FOR PACKAGES OF FOOD PRODUCTS

[75] Inventor: Luigi D. Bella, Viale Vittorio Veneto, 39, 31100 Treviso, Italy

[73] Assignee: Luigi D. Bella, Treviso Tv, Italy

[21] Appl. No.: 184,866

[22] Filed: Apr. 22, 1988

[51] Int. Cl.[4] ........................ B65G 59/02; G07F 11/14

[52] U.S. Cl. ........................................ 221/67; 221/192; 312/43

[58] Field of Search ................. 221/67, 121, 122, 129, 221/132, 192; 312/312, 43

[56] References Cited

U.S. PATENT DOCUMENTS

| | | | |
|---|---|---|---|
| 1,434,057 | 10/1922 | Horwitt | 221/67 |
| 2,493,212 | 1/1950 | Zimmermann et al. | 221/122 X |
| 2,560,255 | 7/1951 | Shirley | 221/121 X |
| 3,179,289 | 4/1965 | Moyer et al. | 221/121 |
| 3,456,817 | 7/1969 | Irazoqui | 221/122 X |
| 3,786,958 | 1/1974 | de Morgan | 221/67 |
| 4,109,825 | 8/1978 | Weitzman | 221/122 X |
| 4,350,264 | 9/1982 | Muller | 221/67 |
| 4,398,651 | 8/1983 | Kumpfer | 221/129 X |
| 4,671,425 | 6/1987 | Knoll | 221/122 X |

FOREIGN PATENT DOCUMENTS

| | | | |
|---|---|---|---|
| 0921856 | 3/1963 | United Kingdom | 221/67 |

*Primary Examiner*—Andres Kashnikow
*Assistant Examiner*—Mark T. Le
*Attorney, Agent, or Firm*—Guido Modiano; Albert Josif

[57] ABSTRACT

The dispenser contains a rotary magazine comprising a plurality of radial sectors, each containing plates of food stacked on the top of each other. The configuration of the plates allows the bottom of one plate not to rest on the food contained in the underlying plate. The machine furthermore comprises an elevator adapted to convey the plate selected by the user to a pair of movable jaws adapted to place the plate outside the machine or in an oven. A window may be provided at the rotary magazine to allow a user to view the plates contained therein.

20 Claims, 2 Drawing Sheets

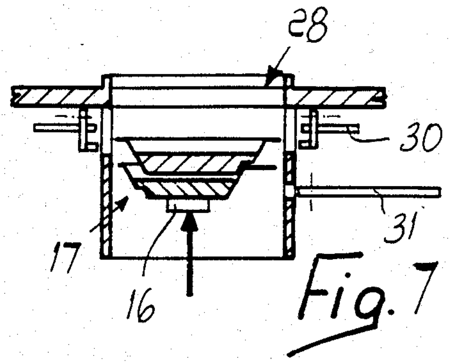
Fig. 7
Fig. 6
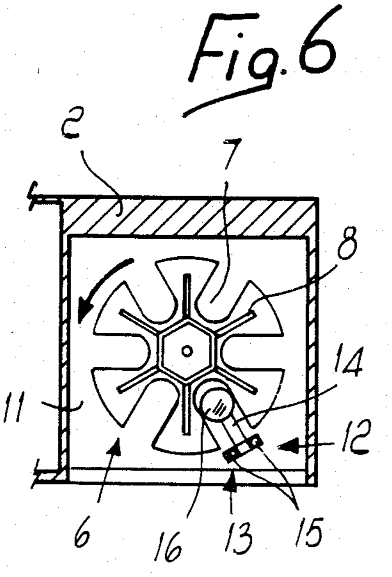
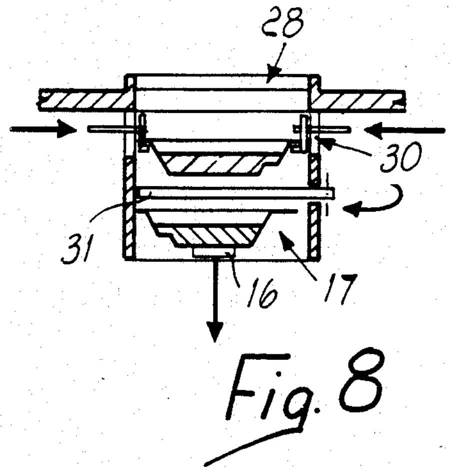
Fig. 8
Fig. 10
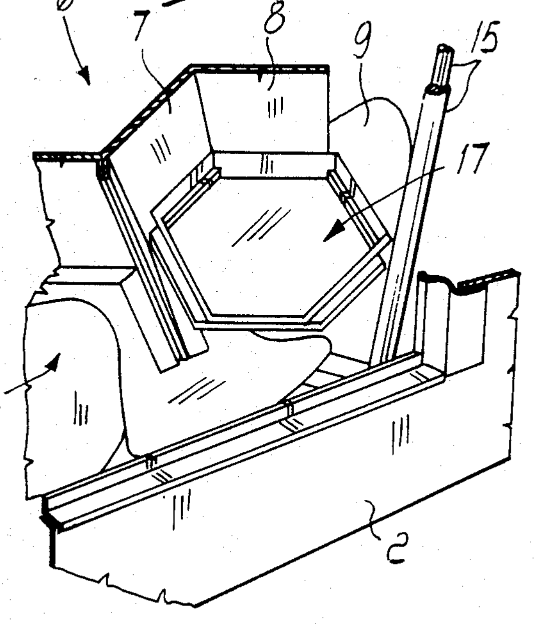
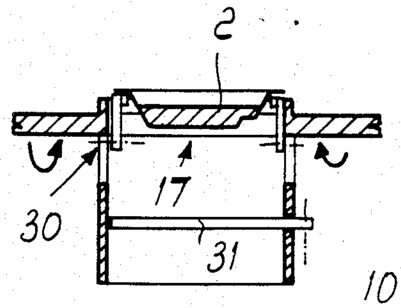
Fig. 9

AUTOMATIC DISPENSER, PARTICULARLY FOR PACKAGES OF FOOD PRODUCTS

BACKGROUND OF THE INVENTION

The present invention relates to an automatic dispenser, particularly for packages of food products.

Various types of devices are currently known for automatically dispensing fried food such as, for example, potato chips or cold snacks such as sandwiches or prepacked buns.

The devices for dispensing fried food usually comprise a box-like structure containing a cup elevator or dredge for extracting, for example pre-cooked and frozen food, from a refrigerator or they have a fixed container fitted with a hopper for conveying the food into the fryer by gravity.

The devices for dispensing cold snacks have a plurality of fixed vertical containers arranged side by side and each accommodating a stack of a separate type of food.

All such known types of devices have the disadvantage of storing food in an inefficient manner, thereby occupying a considerable volume which increases the overall volume of the device itself.

Furthermore, if fixed vertical containers are used, the individual food packages are stacked on the top of each other, with the consequent risk of being crushed.

This not only limits the number of packages which can be stacked within the device, but also the amount and the type of food which can be contained in such packages.

SUMMARY OF THE INVENTION

The aim of the present invention is therefore to eliminate the disadvantages described above in known types of food dispensing devices by providing an apparatus which can store in an optimum manner a considerable number of packages of food, and which may even contain different quantities and types of food.

Within the scope of the above described aim, an important object is also to provide an apparatus which can dispense food packages that are different from one another in quantity and type without damaging such packages during storage.

Another important object is to provide an apparatus which allows the user to view the package when selecting the desired food product.

A further object is to provide an apparatus which is structurally simple, compact and which does not require specific maintenance.

The above mentioned aim and objects, as well as others which will become apparent hereinafter, are achieved by an automatic dispenser, particularly for packages of food products, comprising a box-like structure having an exhibitor, a rotary magazine, having a plurality of radial sectors, each containing plates of food stacked on the top of each other wherein the bottom of each plate does not rest on the food provided on the underlying plate, said dispenser further comprising an elevator adapted to convey at least one one said plates present in one of said sectors to adapted of said plates to a pair of jaws, adapted for moving the plate outside said box-like structure.

Conveniently, a window is formed in said box-like structure beside said rotary magazine, for showing the plates contained therein.

BRIEF DESCRIPTION OF THE DRAWINGS

Further characteristics and advantages of the invention will become apparent from the detailed description of a particular but not exclusive embodiment, illustrated only by way of non-limitative example in the accompanying drawings, wherein:

FIG. 6 is a view, taken along a plane transverse to the machine, of the rotary magazine;

FIGS. 7, 8 and 9 shown how each plate is moved at the opening present on the machine;

FIG. 10 is a perspective view of the magazine with two stacked plates.

BRIEF DESCRIPTION OF THE PREFERRED EMBODIMENTS

Figure 1:
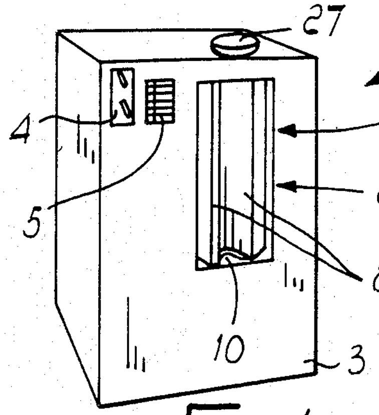
FIG. 1 is a perspective view of the machine.

With reference to the above described figures, the automatic dispenser 1 for the distribution of packages of food products 2 comprises a box-like structure 3 having a coin box 4 and an exhibitor 5 provided with a button panel.

The box-like structure 3 may contain a refrigerator, not illustrated in the drawing figures, and it comprises a rotary magazine 6.

The rotary magazine 6 comprises a central rotatable shaft 7 having a hexagonal transverse cross section.

From the vertices of said central rotatable shaft 7 there protrudes in corresponding number of radial sectors 8.

The central rotatable shaft 7 and the radial sectors 8 have downwardly rigidly associated therewith a planar surface 9, having a circular configuration. Radial openings 10 are provided in the planar surface 9, at a portion thereof interposed between two adjacent sectors 8. The central rotatable shaft 7 is actuated by a suitable motor, not illustrated, and rests on a base 11 having a seat 12 for housing an elevator 13.

The elevator 13 comprises an arm 14, movable on two vertical guides 15 and having an end provided with a circular support 16 for plates 17, said support being slideable through said radial openings 10.

The plates 17 are arrangeable, stacked on the top of each other, at the interspace defined between two contiguous radial sectors 8. Said plates, which are identical to one another, perimetrally define the shape of a regular hexagon. For the sake of clarity, two plates will be described hereinafter, which are identical in shape and dimensions, but which are rotated through 60° with respect to one another.

Said plates each have three first alternate sides, indicated by the numerals 18*a*, 18*b*, 19*a*, 19*b* and 20*a*, 20*b* constituting the sides of a first regular hexagon. The second three remaining sides, indicated for the two plates by the numerals 21*a*, 21*b*, 22*a*, 22*b*, 23*a* and 23*b*, again correspond to the sides of a second regular hexagon, having however greater dimensions than the first regular hexagon. The external dimensions are in any case those of a regular hexagon.

On the bottom of each of said two plates there are furthermore provided, at the three non-consecutive sides 18a, 18b, 19a, 19b and 20a, 20b, recessed seats indicated by the numerals 24a, 24b, 25a, 25b and 26a, 26b which are provided parallel to the corresponding side.

The configuration of the plate 17 therefore allows stacking without the food products 2 of one plate touching the bottom of the overlying plate.

Each successive plate is rotated through 60 degrees when the plates are stacked in the dispenser.

Figure 5:
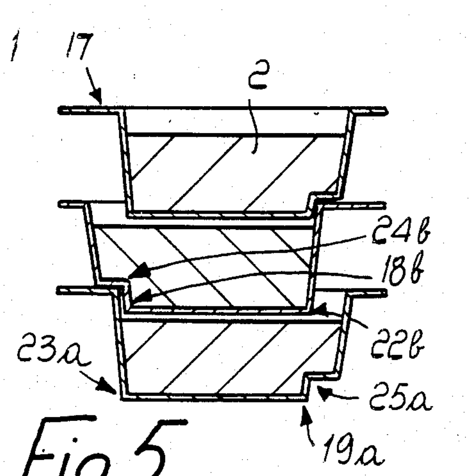
FIG. 5 is a view of the stacked plates taken along the sectional plane V—V of FIG. 2.
Figure 2:
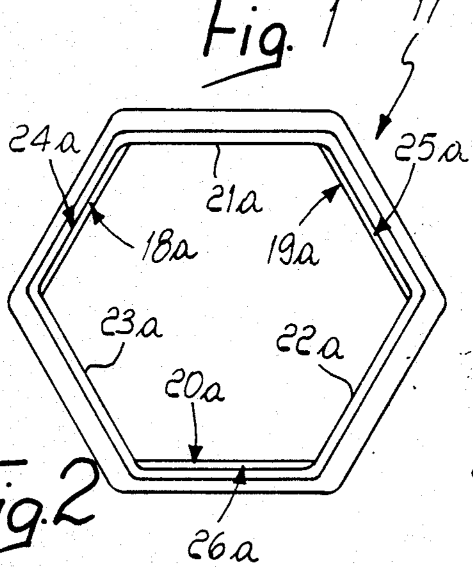
FIGS. 2 and 3 are top plan views of a same plate, the second one whereof is rotated by an angle of 60° with respect to the first.
Figure 3:
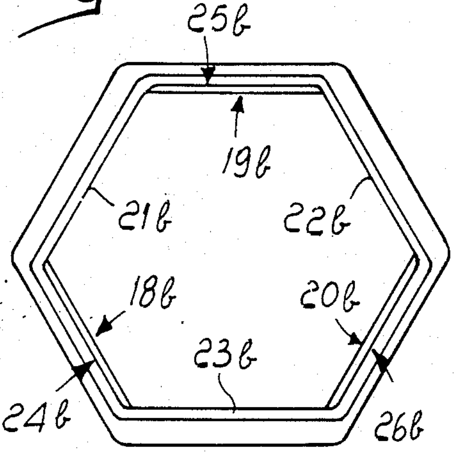
Figure 4:
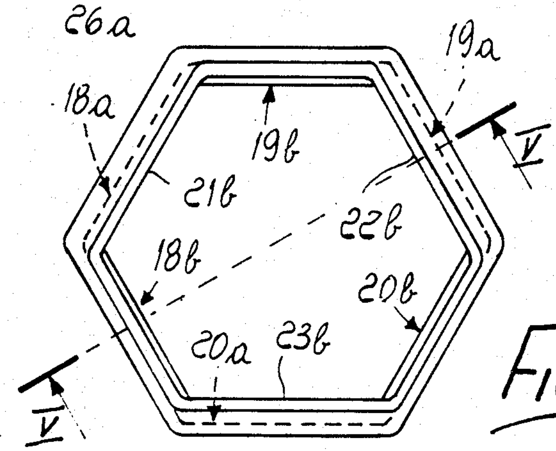
FIG. 4 is a view, similar to the previous one, of the two stacked plates.

This condition, illustrated in FIGS. 4, 5 and 7, allows to have the bottom of the upper plate rest, at the recessed seats 24b, 25b and 26b, on the edges of the underlying plate, respectively at the sides 23a, 21a and 22a.

Each plate therefore rests on three sides of the underlying plate, thereby maintaining a preset distance between the bottom of each plate and the underlying food products 2.

At the upper end of the box-like structure 3 there is a removable cover 27 for covering an opening 28 provided at the axis of said circular support 16.

The use of the automatic dispenser is the following: once the user has selected the desired plate, which operation is facilitated by the provision of a window 29 on the front of the structure 3, the elevator 13 lifts the selected stack of plates.

Once it has arrived proximate to the opening 28, the plate at the top of the stack is hooked by adapted movable jaws 30 which, by being eccentrically pivoted, upon rotation, position the plate 17 at the opening 28, for access by a user.

Before the jaws 30 are rotated, the elevator 13 lowers the support 16, and a dividing partition 31 occludes the duct for the exit of the plates.

This prevents the user from gaining access to the other plates of the stack, once he has taken a plate.

Naturally the movement of the rotary magazine 6, of the elevator 13, of the jaws 30, and of the dividing partition 31 is adjusted by suitable motor means controlled by a centralized logic unit located at the interior of said box-like structure 3.

In practice the machine achieves the intended aim and objects, being and is very simple to use.

In fact, the use of a rotary magazine, which in the particular embodiment allows to stack six stacks of plates, allows not only to pack a considerable number of food packages in its interior in an optimum manner, but also permits storage of different types and qualities of food, thereby offering the purchaser a considerable choice.

The particular structure studied for the plates furthermore allows the stacking thereof without the food products contained therein being crushed or damaged in the storage step.

Furthermore, the presence of a window on the box-like structure allows the user to visually verify the particular package previously selected in the exhibitor 5.

Furthermore, the use of the rotary magazine allows to obtain a very simple and compact structure.

Naturally the food package inside each plate may be any, according to requirements.

The invention thus conceived is susceptible to numerous modifications and variations, all of which are within the scope of the same inventive concept.

Thus, for example, the number of radial sectors may be any and the configuration of the plates may vary, using the same concept to allow them to be stacked on top of each other without the food products making contact with the bottom of the overlying plate.

Naturally the materials, as well as the dimensions of the individual components of the automatic machine for the distribution of packages of food products may also be any, according to the specific requirements.

I claim:

1. Automatic dispenser particularly for packages of food comprising;
- at least one box-like structure,
- at least one exhibitor associated with said box-like structure,
- at least one rotary magazine located within said box-like structure,
- a plurality of radial sectors defined by said rotary magazine,
- a plurality of plates each containing food and having a bottom, said plurality of plates being stacked on top of each other in at least one of said sectors whereby said bottom of one plate does not contact food contained in an underlying plate,
- means for moving at least at least one of said plurality of plates outside said box-like structure, and
- at least one elevator adapted for conveying said at least one of said plurality of plates from said one of said sectors to said means for moving,
- wherein said plurality of plates are all identical to each other, and wherein each plate in said plurality of plates comprises;
- three first alternate sides defining alternate sides of a first regular hexagon,
- three remaining sides defining sides of a second regular hexagon, said second regular hexagon having greater dimensions than said first regular hexagon,
- a perimetral contour having a regular hexagonal shape,
- at least one bottom, and
- a plurality of recessed seats, said recessed seats being formed in said bottom adjacent said first three alternate sides, each recessed seat in said plurality of recessed seats extending parallel to an adjacent one of said three first alternate sides.

2. Automatic dispenser according to claim 1, wherein said box-like structure contains refrigeration means, at least one logic unit, and motor means, said logic unit controlling said motor means for actuating said elevator, said rotary magazine, and said means for moving at least one of said plurality of plates outside said box-like structure.

3. Automatic dispenser according to claim 1, further comprising motor means and at least one logic unit, and wherein said means for moving at least one of said plurality of plates outside said box-like structure comprise at least two eccentrically pivoted jaws, said logic unit controlling said motor means for actuating said jaws.

4. Automatic dispenser according to claim 1, wherein said rotary magazine comprises;
- at least one central rotatable shaft,
- a hexagonal cross-sectional configuration defined by said shaft,
- six vertices defined by said hexagonal cross-sectional configuration,
- a plurality of radial sectors protruding from said vertices,
- a planar surface downwardly rigidly associated with said rotatable shaft and said plurality of radial sectors, and
- a plurality of radial openings formed in said planar surface, each radial opening in said plurality of radial openings being interposed between adjacent sectors of said plurality of radial sectors.

5. Automatic dispenser according to claim 4, wherein said rotatable shaft rests on a base, said base having formed therein at least one seat, said seat being adapted for housing said elevator.

6. Automatic dispenser according to claim 4, wherein said rotatable shaft rests on a base, said base having formed therein at least one seat, said seat being adapted for housing said elevator, and wherein said elevator comprises at least two substantially vertical guides, at least one arm movable along said substantially vertical guides and having an end, and at least one support element, said support element being associated with said end of said arm and slideable through said radial openings.

7. Automatic dispenser according to claim 4, wherein said elevator comprises at least two substantially vertical guides, at least one arm movable along said substantially vertical guides and having an end, and at least one support element having an axis, said support element being associated with said end of said arm and slideable through said radial openings, and wherein said box-like structure has formed therein at least one opening, said opening being located above said support element.

8. Automatic dispenser particularly for packages of food comprising;

at least one box-like structure, at least one exhibitor associated with said box-like structure, at least one rotary magazine located within said box-like structure, a plurality of radial sectors defined by said rotary magazine, a plurality of plates each containing food and having a bottom, said plurality of plates being stacked on top of each other in at least one of said sectors whereby said bottom of one plate does not contact food contained in an underlying plate, means for moving at least at least one of said plurality of plates outside said box-like structure, and at least one elevator adapted for conveying said at least one of said plurality of plates from said one of said sectors to said means for moving, wherein said plurality of plates are all identical to each other, and wherein each plate in said plurality of plates comprises;

at least three first alternate sides defining alternate sides of a first regular polygon, at least three remaining sides defining sides of a second regular polygon, said second regular polygon having greater dimensions than said first regulator polygon, a perimetral contour having a regular polygonal shape, at least one bottom, and a plurality of recessed seats, said recessed seats being formed in said bottom adjacent said first alternate sides, each recessed seat in said plurality of recessed seats extending substantially parallel to an adjacent one of said alternate sides.

9. Automatic dispenser according to claim 8, wherein said box-like structure contains refrigeration means, at least one logic unit, and motor means, said logic unit controlling said motor means for actuating said elevator, said rotary magazine, and said means for moving at least one of said plurality of plates outside said box-like structure.

10. Automatic dispenser according to claim 8, further comprising motor means and at least one logic unit, and wherein said means for moving at least one of said plurality of plates outside said box-like structure comprise at least two eccentrically pivoted jaws, said logic unit controlling said motor means for actuating said jaws.

11. Automatic dispenser according to claim 8, wherein said rotary magazine comprises;

at least one central rotatable shaft, a polygonal cross-sectional configuration defined by said shaft, a plurality of vertices defined by said polygonal cross-sectional configuration, a plurality of radial sectors protruding from said vertices, a planar surface downwardly rigidly associated with said rotatable shaft and said plurality of radial sectors, and a plurality of radial openings formed in said planar surface, each radial opening in said plurality of radial openings being interposed between adjacent sectors of said plurality of radial sectors.

12. Automatic dispenser according to claim 11, wherein said rotatable shaft rests on a base, said base having formed therein at least one seat, said seat being adapted for housing said elevator.

13. Automatic dispenser according to claim 11, wherein said rotatable shaft rests on a base, said base having formed therein at least one seat, said seat being adapted for housing said elevator, and wherein said elevator comprises at least two substantially vertical guides, at least one arm movable along said substantially vertical guides and having an end, and at least one support element, said support element being associated with said end of said arm and slideable through said radial openings.

14. Automatic dispenser according to claim 8, wherein said elevator comprises at least two substantially vertical guides, at least one arm movable along said substantially vertical guides and having an end, and at least one support element having an axis, said support element being associated with said end of said arm and slideable through said radial openings, and wherein said box-like structure has formed therein at least one opening, said opening being located above said support element.

15. Automatic dispenser particularly for packages of food comprising;

at least one box-like structure, at least one exhibitor associated with said box-like structure, at least one rotary magazine located within said box-like structure, a plurality of radial sectors defined by said rotary magazine, a plurality of plates each containing food and having a bottom, said plurality of plates being stacked on top of each other in at least one of said sectors whereby said bottom of one plate does not contact food contained in an underlying plate, means for moving at least at least one of said plurality of plates outside said box-like structure, and at least one elevator adapted for conveying said at least one of said plurality of plates from said one of said sectors to said means for moving, wherein said plurality of plates are all identical to each other, wherein each plate in said plurality of plates comprises;

at least three first alternate sides defining alternate sides of a first regular polygon, at least three remaining sides defining sides of a second regular polygon, said second regular polygon having greater dimensions than said first regular polygon, a perimetral contour having a regular polygonal shape, at least one bottom, and a plurality of recessed seats, said recessed seats being formed in said bottom adjacent said first alternate sides, each recessed seat in said plurality of recessed seats extending substantially parallel to an adjacent one of said alternate sides, and wherein said box-like structure contains at least one logic unit, and motor means, said logic unit controlling said motor means for actuating said elevator, said rotary magazine, and said means for moving at least at least one of said plurality of plates outside said box-like structure.

16. Automatic dispenser according to claim 15, further comprising motor means and at least one logic unit, and wherein said means for moving at least one of said plurality of plates outside said box-like structure comprise at least two eccentrically pivoted jaws, said logic unit controlling said motor means for actuating said jaws.

17. Automatic dispenser according to claim 15, wherein said rotary magazine comprises;

at least one central rotatable shaft, a polygonal cross-sectional configuration defined by said shaft, a plurality of vertices defined by said polygonal cross-sectional configuration, a plurality of radial sectors protruding from said vertices, a planar surface downwardly rigidly associated with said rotatable shaft and said plurality of radial sectors, and a plurality of radial openings formed in said planar surface, each radial opening in said plurality of radial openings being interposed between adjacent sectors of said plurality of radial sectors.

18. Automatic dispenser according to claim 17, wherein said rotatable shaft rests on a base, said base having formed therein at least one seat, said seat being adapted for housing said elevator.

19. Automatic dispenser according to claim 17, wherein said rotatable shaft rests on a base, said base having formed therein at least one seat, said seat being adapted for housing said elevator, and wherein said elevator comprises at least two substantially vertical guides, at least one arm movable along said substantially vertical guides and having an end, and at least one support element, said support element being associated with said end of said arm and slideable through said radial openings.

20. Automatic dispenser according to claim 17, wherein said elevator comprises at least two substantially vertical guides, at least one arm movable along said substantially vertical guides and having a end, and at least one support element having an axis, said support element being associated with said end of said arm and slideable through said radial openings, and wherein said box-like structure has formed therein at least one opening, said opening being located above said support element.

* * * * *